United States Patent [19]

Tanaka et al.

[11] Patent Number: 4,800,574
[45] Date of Patent: Jan. 24, 1989

[54] DIGITAL MODULATOR/DEMODULATOR INCLUDING NON-LINEAR ANALOG-TO-DIGITAL CONVERTER AND CIRCUITRY COMPENSATING FOR THE NON-LINEARITY OF THE CONVERTER

[75] Inventors: Shigetaka Tanaka; Toshiaki Tanigawa, both of Atsugi; Mitsuru Kaga, Hatano, all of Japan

[73] Assignee: Ricoh Company, Ltd., Tokyo, Japan

[21] Appl. No.: 609,405

[22] Filed: May 7, 1984

[30] Foreign Application Priority Data

May 10, 1983 [JP] Japan .................................. 58-80145
Jun. 2, 1983 [JP] Japan .................................. 58-96915
Jun. 3, 1983 [JP] Japan .................................. 58-98033

[51] Int. Cl.⁴ ............................................ H04B 14/04
[52] U.S. Cl. ...................................... 375/26; 375/122; 341/140
[58] Field of Search ..................... 375/14, 30, 122, 25, 375/26; 381/29, 30, 31; 340/347 AD, 347 CC; 358/133, 138

[56] References Cited

U.S. PATENT DOCUMENTS

| 3,533,098 | 10/1970 | Munoz ......................... 340/347 CC |
| 3,790,947 | 2/1974 | Campbell et al. ...................... 375/26 |
| 4,037,049 | 7/1977 | Lyon ........................................ 375/8 |
| 4,343,759 | 8/1982 | Kustka et al. .......................... 375/14 |
| 4,457,004 | 6/1984 | Gersho et al. ......................... 375/39 |
| 4,467,318 | 8/1984 | Zeitraeg ................................. 375/25 |
| 4,486,876 | 12/1984 | Gaunt, Jr. et al. .................... 375/30 |
| 4,501,001 | 2/1985 | Virupaksha et al. ................. 375/30 |
| 4,544,916 | 10/1985 | Sharper ................................. 375/30 |

FOREIGN PATENT DOCUMENTS 55-45249  3/1980  Japan ............................ 340/347 CC

*Primary Examiner*—Benedict V. Safourek
*Assistant Examiner*—Stephen Chin
*Attorney, Agent, or Firm*—David G. Alexander

[57] ABSTRACT

A low cost analog-to-digital converter having a non-linear conversion characteristic produces an output digital signal non-linearly relative to an input analog transmission signal which is applied thereto for demodulation. A compensation circuit having a non-linear conversion characteristic converts the non-linear digital signal output from the analog-to-digital converter into a linear digital signal which has a larger number of bits than the non-linear digital signal.

5 Claims, 12 Drawing Sheets

DIGITAL MODULATOR/DEMODULATOR INCLUDING NON-LINEAR ANALOG-TO-DIGITAL CONVERTER AND CIRCUITRY COMPENSATING FOR THE NON-LINEARITY OF THE CONVERTER

BACKGROUND OF THE INVENTION

The present invention relates to a digital modulator/demodulator (modem) for use with, for example, a facsimile apparatus which transmits picture data, symbol data and the like over a telephone line or like analog transmission line. More particularly, the present invention is concerned with a digital modem which achieves various functions necessary for a modem by use of a digital signal processor.

There has been proposed a digital modem of the type which uses a digital signal processor to realize various functions necessary for a modem such as coding, decoding, modulation, demodulation, line equalization and filtering. In U.S. Pat. No. 4,085,449, for example, such modem functions are achieved by means of a single processing unit. The problem encountered with this type of modem is that, since some of the functions need only to proceed at an encoding rate and some have to proceed at a sampling rate and, moreover, a relatively large amount of data are exchanged between the functions, the various functions cannot be implemented unless the single processor features a significant performance or a prohibitively intricate interface to the outside is employed.

One of the functions assigned to a modem is a shaping filter function. The tap constant of the filter depends on the sampling rate and modulation rate of signals. In a modem of the type employing a digital signal processor, since the sampling rate of signals is usually fixed, a system capable of using various modulation rates is unattainable unless it is furnished with a plurality of sets of tap constants which match with the desired modulation rates. To store the plurality of tap constant sets as data, a random access memory (RAM) or a read only memory (ROM) is required to have a store area with a substantial capacity. Further, data for realizing the filtering function, equalizing function or the like are stored in a data memory such as a RAM or a ROM. A prior art digital signal processor has been constructed to use the entire regions of the data memory for the respective modem functions. To access such regions, therefore, a substantial number of bits are required for an address portion of an instruction and a substantial number of address lines have to be installed, resulting in the need for a ROM having a large capacity.

Meanwhile, a facsimile apparatus operable in a so-called GIII mode has recently been standardized by CCITT (Consultive Committee of International Telegraph and Telephone) in order to promote fast transmission of picture information, and such apparatuses are now in practical use. In a GIII facsimile apparatus, it is a usual practice to transmit by a digital modem a coded signal with the redundancy of a facsimile picture signal cut down by a digital band compression technique, with a view to shortening the transmission time. Such a modem comprises, in accordance with the GIII standard, modems prescribed by the CCITT Recommendations V.27 and V.29. The V.27 modem operates with a transmission rate of 4,800 bps (bits/second) and an 8-level differential phase-shift keying (PSK) system, while the V.29 modem operates with a transmission rate of 9,600 bps and a quadrature amplitude modulation (QAM) system.

To date, in order that a received signal on a transmission line may be surely recovered, a digital signal processor for performing modulation and computation processings is designed to handle as large a number of data bits as possible (e.g. 16 bits). Therefore, it is a prerequisite to convert analog signals on a transmission line to digital signals which are identical in the number of bits with data handled by the digital signal processor. However, an analog-to-digital converter accommodating a relatively large number of data bits and operable with a conversion time short enough for relatively high-speed data transmission is expensive, resulting in an expensive digital modem construction.

SUMMARY OF THE INVENTION

It is therefore a first object of the present invention to provide a digital modem which imposes a minimum of limitation on the performance and construction of a processing unit employed.

It is a second object of the present invention to provide a modem which does not need many storage regions of a digital signal processor system.

It is a third object of the present invention to provide a digital modem which promotes the use of a general purpose analog-to-digital converter with a relatively small number of conversion bits, by converting output data of an analog-to-digital converter having a non-linear characteristic to a linear characteristic so as to substantially increase the number of conversion bits.

It is a fourth object of the present invention to provide a generally improved digital modem.

In one aspect of the present invention, there is provided a digital modulator/demodulator for performing at least coding, modulation/demodulation, line equalization and decoding on a signal by digital signal processings, and sending signal to an analog transmission line. The digital modulator/demodulator comprises a first processor operable at a first rate for performing, among the functions, ones which are to be performed at a relatively high processing rate, and a second processor connected to the first processor and operable at a second rate which is lower than the first rate for performing, among the functions, ones which are to be performed at a relatively low processing rate.

In another aspect of the present invention, there is provided a modulator/demodulator for sampling a signal modulated at a modulation frequency at a sampling frequency and performing modulation and demodulation functions inclusive of a shaping filter function by means of a digital processor. A number of samples on a frequency axis of a filter characteristic of a shaping filter is fixed. A memory of the digital processor stores tap constants of said shaping filter. The tap constants are used commonly for signals having different modulation frequencies by varying the sampling frequency in response to the modulation frequency.

In another aspect of the present invention, there is provided a digital demodulator for demodulating a transmission signal on a line after converting the transmission signal to a digital signal. The demodulator comprises an analog-to-digital converter having a non-linear conversion characteristic which converts an output digital signal non-linearly relative to the input transmission signal, and a compensation device for compensating a digital signal output from the analog-to-digital converter to make the digital signal non-linear relative to the transmission signal.

The above and other objects, features and advantages of the present invention will become apparent from the following detailed description taken with the accompanying drawings.

DESCRIPTION OF THE PREFERRED EMBODIMENT

While the digital modem of the present invention is susceptible of numerous physical embodiments, depending upon the environment and requirements of use, substantial numbers of the herein shown and described embodiments have been made, tested and used, and all have performed in an eminently satisfactory manner.

An embodiment of the present invention elaborated to achieve the previously stated first object will be described first.

Before entering into detailed description of a digital modem in accordance with the first embodiment, functions of a general modem will be discussed with reference to FIGS. 1 and 2.

Figure 1:
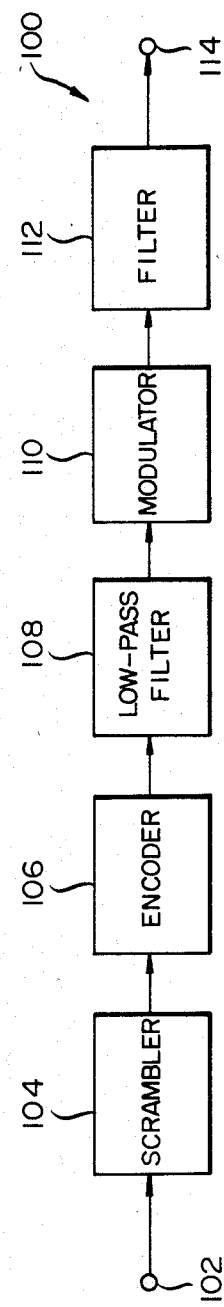
FIG. 1 is a function block diagram representative of a general construction of a modulator to which a first embodiment of the present invention contemplated to achieve the first object is applicable.
Figure 2:
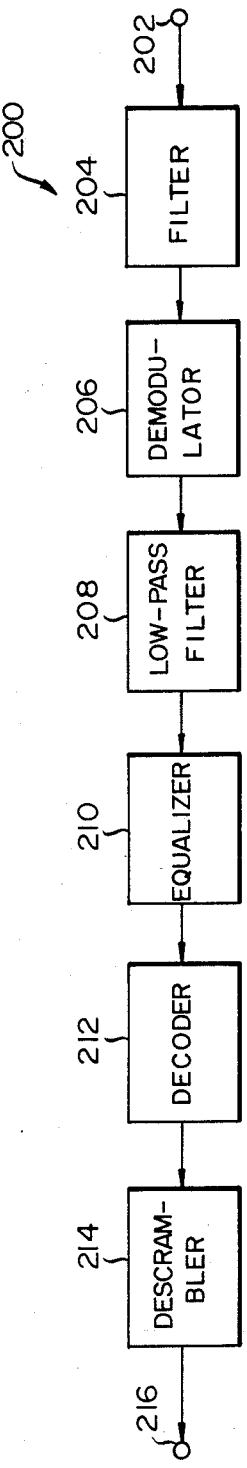
FIG. 2 is a functional block diagram representative of a general construction of a demodulator to which the first embodiment is applicable.

Referring to FIG. 1, in a modulating section 100, a string of binary encoded data bits are applied from a facsimile apparatus, computer or like host machine to an input port 102. The data bits are arranged in a random sequence by a scrambler 104 and then, coded by an encoder 106 to become a single code on an "n" bits basis. Therefore, the output of the encoder 106 is capable of having "$2^n$" statuses. The coding rate is 1/T symbols/second where T is an intersymbol interval. Concerning 8-level PSK tribits, for example, n is "3". The output of the encoder 106 is applied to a low-pass filter 108 to reduce the influence of a frequency characteristic particular to a transmission line. The output of the low-pass filter 108 is modulated by a modulator 110 and, via a filter 112, sent out to an analog transmission line 114 which may be a telephone line, for example.

Figure 3:
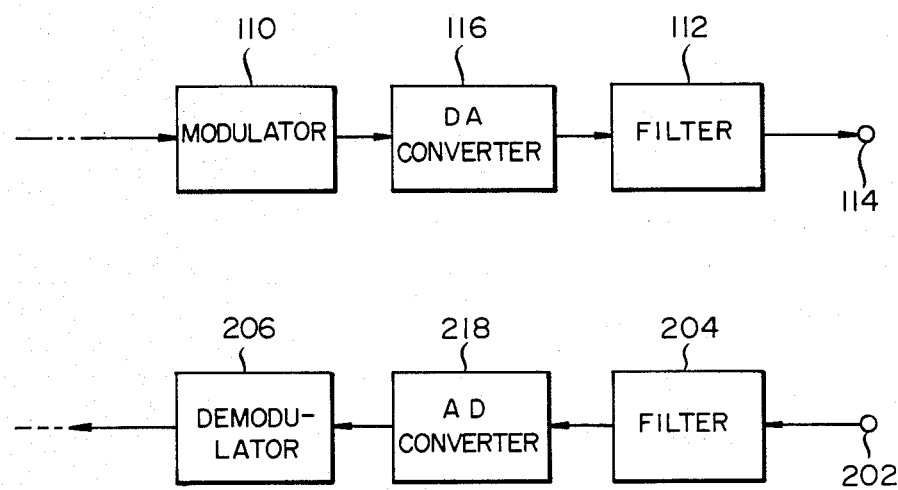
FIG. 3 is a block diagram of a digital-to-analog and analog-to-digital conversion sections applicable to a case wherein the modulator and demodulator shown in FIGS. 1 and 2 are implemented by a digital processor.

A demodulating section 200 includes a filter 204 to which a signal coming in through a transmission line 202 is applied. The filter 204 removes noise components in a needless band from the received signal. A demodulator 206 demodulates an output of the filter 204, while a low-pass filter 208 removes harmonics developing in the event of the demodulation. The output of the low-pass filter 208 which is routed to an equalizer 210 usually involves intersymbol interference, because the low-pass filter 108, modulator 110 in the modulating section 100, the transmission lines 114 and 202, the modulator 206 and low-pass filter 208 in the demodulating section 200, and like elements which constitute the transmission system have some distortion in their transmission characteristics. The equalizer 210 serves to remove the intersymbol interference. A decoder 212 obtains "n" binary data from the "$2^n$" code statuses by a procedure opposite to the procedure performed by the modulator 110. The binary data are processed by a descrambler 214 to recover the original sequence and, then, fed from an output port 216 to a host machine as a string of output bits. The binary data, if free from code error, should represent the string of input bits applied to the input port 102 of the transmitting modulator 100.

Where a modem having such a function is to be implemented by a digital signal processing technique, the processings there inside are performed on discrete sample sequence data with respect to both time and signal level. To cope with this situation, as shown in FIG. 3, the interfaces of the modulator 100 and demodulator 200 to the analog transmission lines are respectively provided with a digital-to-analog (DA) converter 116 and an analog-to-digital (AD) converter 218, thereby allowing signals to be processed in the form of digital data.

For example, a telephone line which is a typical example of analog transmission lines has a transmission band of 300 Hz to 4 kHz. As for the modulator, in order that a continuous analog signal produced by the DA converter 116 by processing a signal that is discrete in terms of time may not have a folded spectrum in the transmission band, the sampling frequency has to be at least higher than 8 Hz on the basis of the sampling theorem. Likewise, the demodulator has to be furnished with a sampling frequency at least higher than 8 kHz because the received signal contains frequency components lower than 4 kHz. In this manner, a sampling frequency is usually different from a coding frequency and, moreover, higher than the latter.

In the modulating section 100, for example, the scrambler 104 and encoder 106 operate with the coding frequency, while the low-pass filter 108 and modulator 110 operate with the sampling frequency. In the demodulating section 200, the demodulator 200 and low-pass filter 208 operate with the sampling frequency, while the equalizer 210, decoder 212 and descrambler 214 operate with the coding frequency.

The first embodiment shown and described is applicable to a digital modem of the type wherein signal processings inside a processor occur at at least two different rates as described above. Basically, the first embodiment is directed to implementing the function effected with the coding frequency and the function effected with the sampling frequency each by an exclusive processing device.

Figure 4:
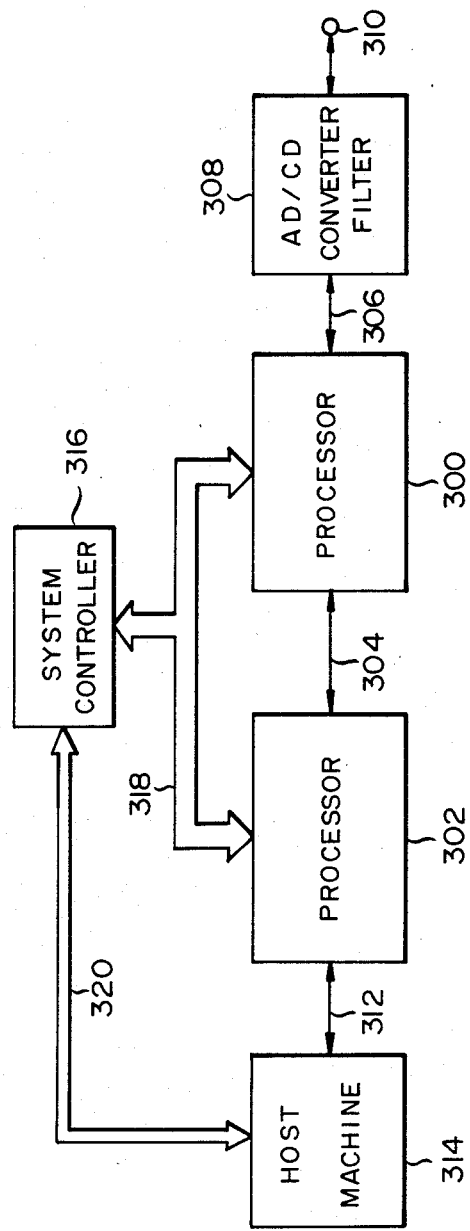
FIG. 4 is a block diagram of a digital modem in accordance with the first embodiment.

Referring to FIG. 4, the digital modem in accordance with the first embodiment comprises two processors 300 and 302 for processing signals. The processor 300 is a digital processor operable with a sampling frequency of, for example, 9,600 Hz and realizes the functions of the low-pass filter 108 and modulator 110 in the modulating section 100 shown in FIG. 1, the demodulator 206 and low-pass filter 208 in the demodulating section 200 shown in FIG. 2, and the like. The processor 302, on the other hand, is a digital processor operable with the coding frequency of, for example, 2,400 Hz and realizes the functions of the scrambler 104 and encoder in the modulating section 100 shown in FIG. 1, the equalizer 210, decoder 212 and descrambler 214 in the demodulating section shown in FIG. 2, and the like. In this manner, signal processing loads are evenly scattered. If desired, the functions may be shared by a larger number of processors depending upon the processing loads.

The signal processors 300 and 302 are interconnected by a data transfer line 304. An input/output data transfer line 306 associated with the processor 300 is connected to an analog transmission line 310 via a function block 308 which includes the DA converter 116, filter 112, AD converter 218 and filter 204 shown in FIG. 3. An input/output data transfer line 312 associated with the processor 302 is connected to a host machine 314 which may be a facsimile apparatus or a host computer. The processors 300 and 302 and host machine 314 are controlled by a system controller 316 via a control bus 318 and an interface 320. Other functions assigned to the system controller 316 include generating clock at the sampling frequency and coding frequency, interface control with the host machine, modem training sequence control, and data flow control.

In a modulation mode, the processor 302 fetches data from a string of input bits from the host machine 314 at the coding frequency, 2,400 Hz in this embodiment, and on an n-bit basis and performs scrambling, coding and other processings on the fetched data. The output of the processor 302 is routed to the processor 300 via the bus 304.

The processor 300 operates with the sampling frequency, 9,600 Hz in this embodiment, and fetches data from the processor 302 once for four samples while making the other data "0". The output of the processor 300 is transferred to the function block 308 to be DA-converted at the sampling frequency and, thereafter, sent out to the transmission line 310.

In a demodulation mode, an analog value sampled at the sampling frequency from the transmission line 310 is converted by the function block 308 into digital data which is then applied to the signal processor 300 via the data transfer line 306. The processor 300 demodulates the input data at the sampling frequency of 9,600 Hz and filters it by a low-pass filter. In the illustrative embodiment, the processor 300 operates at the sampling frequency of 9,600 Hz and the processor 302 at the coding frequency of 2,400 Hz, so that the processor 300 transfers to the processor 302 one data of an optimum timing for data of each string of four samples.

The processor 302 equalizes, decodes and descrambles the data so as to transfer them to the host machine 314 as a string of output bits. In the manner described, the processor 300 performs signal processings at the sampling frequency which is comparatively high, while the processor 302 performs them at the coding frequency which is comparatively low.

While the first embodiment of the present invention has been shown and described in relation with a modem, it may alternatively be applied to a unit featuring a single function, e.g. modulator or demodulator, and effectively usable for processing various signals such as speech and image signals.

In accordance with the first embodiment, a plurality of signal processors share the functions of a modem and one of the processors operates at a sampling rate, which is comparatively high, while the other operates at a coding rate which is compratively low. This reduces the processing load born by each processor, cuts down the amount of data to be exchanged between the processors, and allows the processors to operate relatively independently of each other. Such leads to alleviation of limitations on the performance and structure of processors, particularly those on the interface to the outside, and thereby to simplication of the whole modem configuration.

Another embodiment of the present invention elaborated to achieve the previously stated second object will be described hereinafter.

Figure 5:
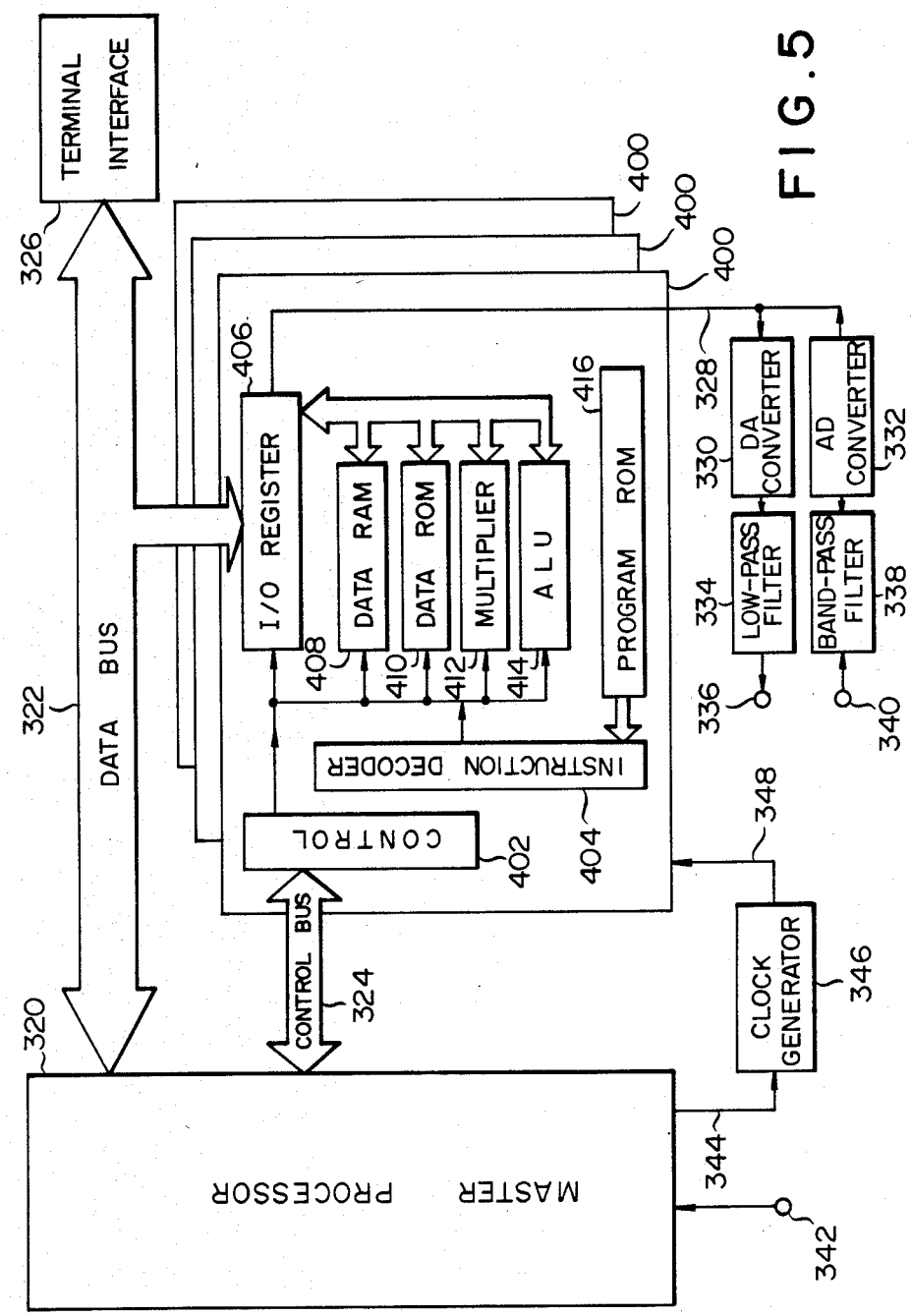
FIG. 5 is a block diagram showing a fundamental construction of a digital signal processor which implements various functions of a demodulator in accordance with a second embodiment of the present invention, which is elaborated to achieve the second object previously described.

Referring to FIG. 5, a signal processor for implementing various functions of a modem in accordance with the second embodiment basically comprises a master processor 320 and a slave processor 400, which are interconnected by a data bus 322 and a control bus 324.

The master processor 320 comprises a digital processor and serves as a system controller for controlling the operation of the whole system. The salve processor 400, also comprising a digital processor, is a signal processor adapted to realize mainly the shaping filter function, line equalizing function and the like of a modem. If desired, a plurality of slave processors 400 identical in construction may be connected in parallel in order to scatter the loads or the tasks.

As shown, the slave processor 400 includes a control section 402, an instruction decoder 404, an I/O register 406, a data RAM 408, a data ROM 410, a multiplier 412, an arithmetic logic unit (ALU) 414, and a program ROM 416. The program ROM 416 stores instructions for causing the system to execute various functions such as filtering and equalizing functions as a program sequence. Such instructions are decoded by the instruction decoder 404. Connected to the control bus 324, the control section 402 receives an instruction from the master processor 320, decodes the instruction, and in turn instructs operations assigned to various portions of the slave processor 400. It is also the control section 402 that instructs switching of memory banks, which will be described later.

Figure 6:
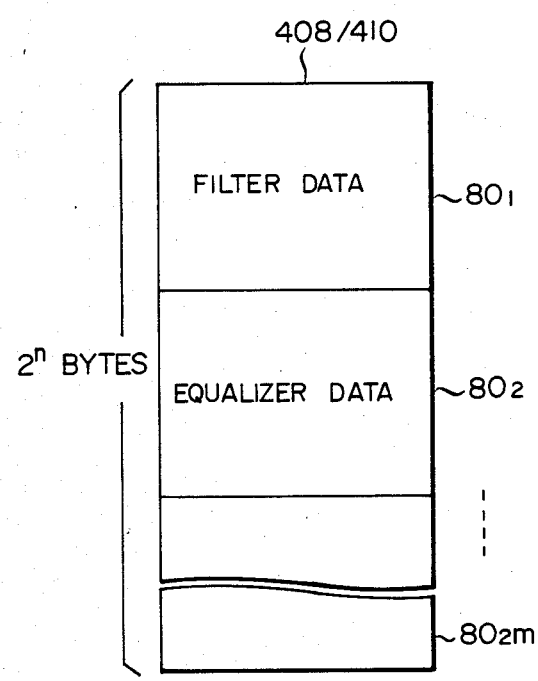
FIG. 6 is a diagram representative of store regions of a data memory in a slave processor shown in FIG. 5.

The data RAM 408 and the data ROM 410 constitute areas for storing various data which are necessary for performing the filter, equalizer and other functions. For example, they store the tap constants of the shaping filter. As shown in FIG. 6, such store areas may be made up of "$2^n$" bytes of store locations and are divided into a plurality of (e.g. $2^m$) regions, or memory banks, $80_1$–$80_2{}^m$, where m and n are natural numbers and in a relation of m<n.

The multiplier 412 and ALU 414 perform calculation with data in the data RAM 408 or those in the data ROM 410 in response to an instruction stored in the program ROM or an instruction from the master processor 320, thereby realizing the filter function and others necessary for a modem.

The I/O register 406 is connected to the data bus 322 which is also connected to a terminal interface 326. Connected to the system via the terminal interface 326 is a facsimile apparatus or like terminal. The I/O register 406 is connected by a line 328 to a DA converter 330 and an AD converter 332. The DA converter 330 is connected via a low-pass filter 334 to a transmit line 336 of an analog communication line, e.g. telephone line. The AD converter 332 is connected via a band-pass filter to a receive line 340 of the analog communication line.

The slave processor 400 realizes various functions of a modem by digital processings. Data modulated by the slave processor 400 are sent out from the I/O register 406 to the transmission line 336 via the DA converter 330 and low-pass filter 334. The signal coming in through the receive line 340 is routed through the band-pass filter 338, AD converter 332 and I/O register 406 to the slave processor 400 to be demodulated thereby.

Applied to one input port 342 of the master processor 320 is a modulation rate instruction signal which will be described. Connected to one output port 344 of the master processor 320 is a clock generator 346 which is adapted to supply the slave processor 400 with sampling clock over a line 348.

Figure 7:
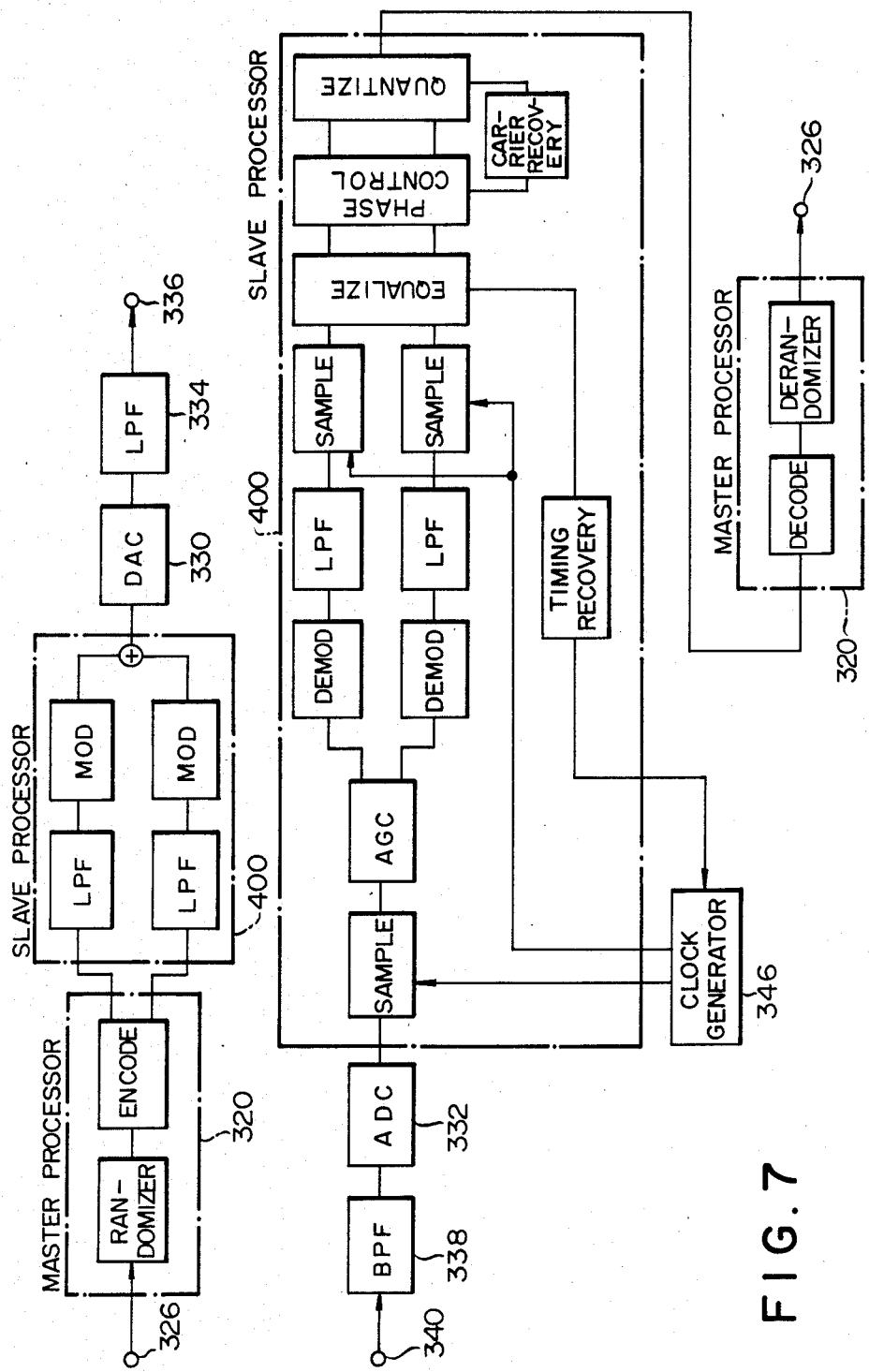
FIG. 7 is a block diagram schematically showing general functions of a modem attainable with the digital signal processor shown in FIG. 5.

Referring to FIG. 7, general functions of a modem which may be implemented by the digital processor shown in FIG. 5 is schematically shown in a block diagram. In FIG. 7, the same blocks as those shown in FIG. 5 are designated by like reference numerals. Upper part of FIG. 7 shows a transmission system and lower part thereof, a receipt system.

At the transmit side, the master processor 320 randomizes and codes a transmission signal, while the slave processor 400 performs low-pass filtering (LPF) and modulation. At the receive side, the slave processor 400 performs sampling, automatic gain control (AGC), demodulation (DEMOD), low-pass filtering, automatic line equalization, phase control, quantization, timing recovery, carrier recovery, etc. Decoding and randomizing the received signal are performed by the master processor 320. Such various modem functions are attained by calculating data stored in the data RAM 408 and those stored in the data ROM 410 according to the instruction sequence stored in the master processor 320 and the program sequence stored in the program ROM 416.

In accordance with the second embodiment, the memory banks $80_1$–$80_2{}^m$ are exclusively matched with the respective functions or respective groups of functions of a modem. For example, as shown in FIG. 6, the bank $80_1$ exclusively stores data which are used for executing the shaping filter function; the data include, for example, tap constants of the filter. Likewise, the bank $80_2$ exclusively stores data which are used for executing the line equalizing function, for example.

Dividing a store area into a plurality of memory banks, or regions, and using each of the regions for an exclusive function as described is effective to reduce the dimensions of a program instruction. More concretely, once a certain task is specified, a region to be accessed in the data memory 408 or 410 is determined and does not extend over a wide range. Taking the configuration shown in FIG. 6 for example, as the control of the slave processor 400 proceeds to a task for performing the shaping filter function, that only the data region $80_1$ is to be used is determined at the beginning of the task. Therefore, the instruction included in this task addresses no store locations but one which lies in the region $80_1$. Then, the control section 402 in the slave processor 400 instructs switching of the memory banks, whereby only the bank $80_1$ is used.

Thus, only "n - m" bits suffice in this embodiment for the length of an address designating portion of each instruction. It follows that an address decoder (not shown) adapted to decode the address designating portion to thereby designate a store location in the data memory 408 or 410 needs only "n - m" bits and, therefore, only "n - m" address lines which are its outputs.

Figure 8:
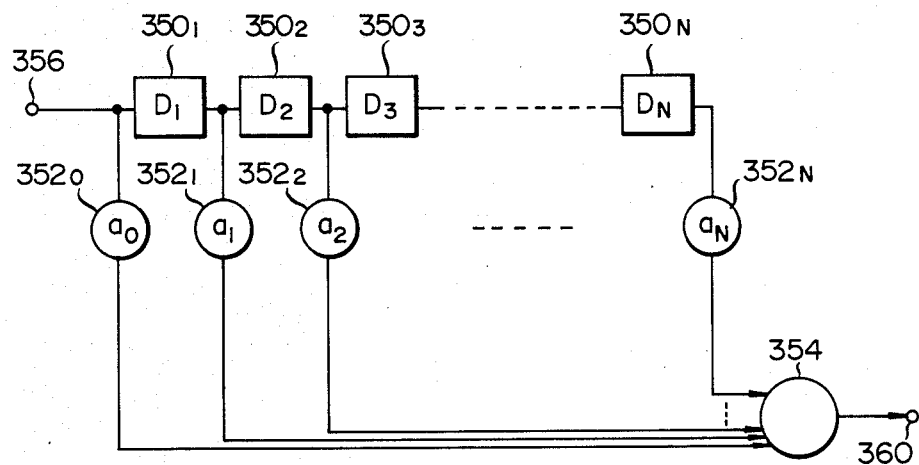
FIG. 8 is a block diagram showing a fundamental construction of a typical non-cyclic digital filter.

Now, as well known in the art, a typical non-cyclic digital filter basically comprises, as shown in FIG. 8, "N" stages of delays $350_1$–$350_N$, "N+1" taps $352_0$–$352_N$, and an adder 354. The delays $350_1$–$350_N$ respectively have amounts of delay D1–DN for sequentially delaying an input to an input terminal 356. The taps $352_0$–$352_N$ respectively have tap constants a0–aN and multiply a signal coming in through the input terminal 356 and outputs of the delays $350_1$–$350_N$ by their tap constants. The outputs of the taps are summed by an adder 354 an output of which is in turn applied to an output terminal 360. The transfer function of the filter is determind by the delay amounts D1–DN and the tap constants a0–aN. Such a filter function is achieved by using data stored in the data RAM 408 and those stored in the data ROM 410 according to the program sequence stored in the program ROM 416 of the slave processor 400.

The tap constants a0–aN of the filter are produced by the inverse Fourier transform of sample values on the frequency axis of the filter characteristic and, therefore, determined by the signal sampling rate and the modulation rate. Assuming that the number of taps N is fixed, fixing a sampling frequency fs as in the prior art system makes it necessary to prepare a set of tap constants for each of the modulation rates fm with which the system deals.

Figure 9:
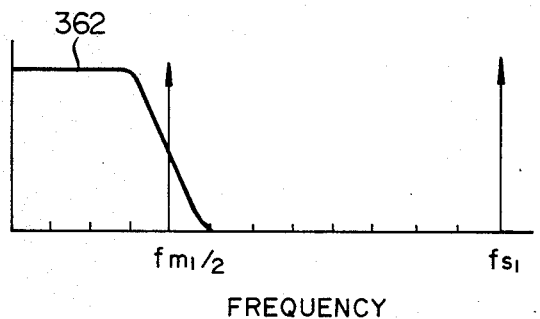
FIGS. 9-11 are graphs representative of a shaping filter characteristic particular to a prior art technique and one attainable with the second embodiment of the present invention.
Figure 10:
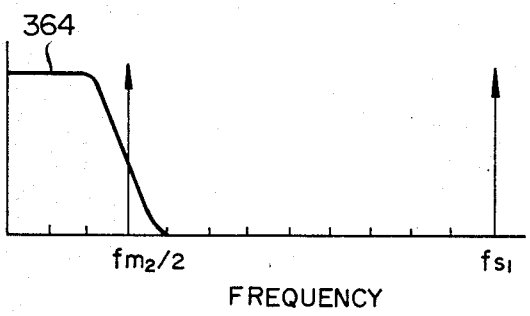
Figure 11:
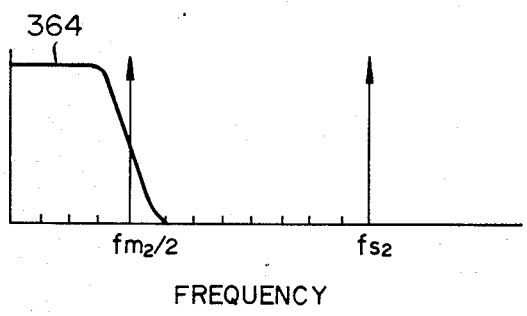

In detail, as shown in FIGS. 9–11, a filter characteristic 362 or 364 to be designed is attenuated by 50% at one half of a modulation frequency fml, i.e. fml/2, as prescribed by CCITT Recommendation V.27ter, for example. Where the number of samples is constant, fixing a sampling frequency fs1 as illustrated in turn fixes a sampling point on the frequency axis. Therefore, the sampling point associated with the modulation frequency fm1 shown in FIG. 9 and the sampling point associated with a modulation frequency fm2 shown in FIG. 10 are different in the sample value of the filter characteristic, requiring different sets of tap constants which respectively match with the different modulation frequencies. This causes a larger store area of the data RAM 408 or that of the data ROM 410 to be occupied for the above purpose.

In accordance with the second embodiment, the master processor 320 instructs a division ratio to the clock generator 346 in responce to a modulation rate instruction signal applied to the input port 342 of the master processor 320, so that a sampling frequency fs matching with a modulation rate fm is supplied from the clock generator 346 to the slave processor 400. That is, the signal sampling frequency is variable in accordance with a modulation frequency. This allows only a single set of tap constants s0–aN to suffice if the sample number of the filter characteristic is constant.

In more detail, for the modulation frequency fm1 as shown in FIG. 9, a sampling frequency fs1 is used while, for the modulation frequency fm2 as shown in FIG. 11, a sampling frequency fs2 is used. In this case, the number of samples on the frequency axis of the filter characteristic is fixed and the signal sampling frequency is variable in proportion to the modulation frequency. Assume that modulation frequency fm1 is 1,600 Hz and the sampling frequency fs1 of that instant is 9,600 Hz, for example. When the modulation rate instruction signal arriving at the input port 342 of the master processor 320 indicates the other modulation frequency fm2 of 1,200 Hz, which is ¾ times fm1, the master processor 320 causes the clock generator 346 to set up such a division ratio that the sampling frequency fs2 turns into 7,200 Hz in proportion thereto. While this shifts down the sampling frequency fs1 to ¾ as shown in FIG. 11, the sampling point on the frequency axis of the filter characteristic remains the same as in FIG. 9. Therefore, the tap constants a0–aN used with the modulation frequency fm1 are usable also with the modulation frequency fm2. Although the tap constants a0–aN are stored in the data ROM 410 of the slave processor 400, they occupy a minimum of area of the data ROM 410 inasmuch as different modulation frequencies share the same tap constants.

As described above, the second embodiment of the present invention enables predetermined tap constants of a shaping filter to be commonly used for different modulation rates, thereby making it possible to use a data memory with a small capacity for storing the tap constants. Since a specific area of the data memory is divided to be used in accordance with the function of a modem, the length of an instruction is shortened to thereby reduce the required capacity of a program memory as well.

Again, the second embodiment described above is naturally applicable to a device which features only a single function, i.e. modulation or demodulation, instead of a modem.

Still another embodiment of the present invention will be described which is directed to achieving the previously mentioned third object.

Figure 12:
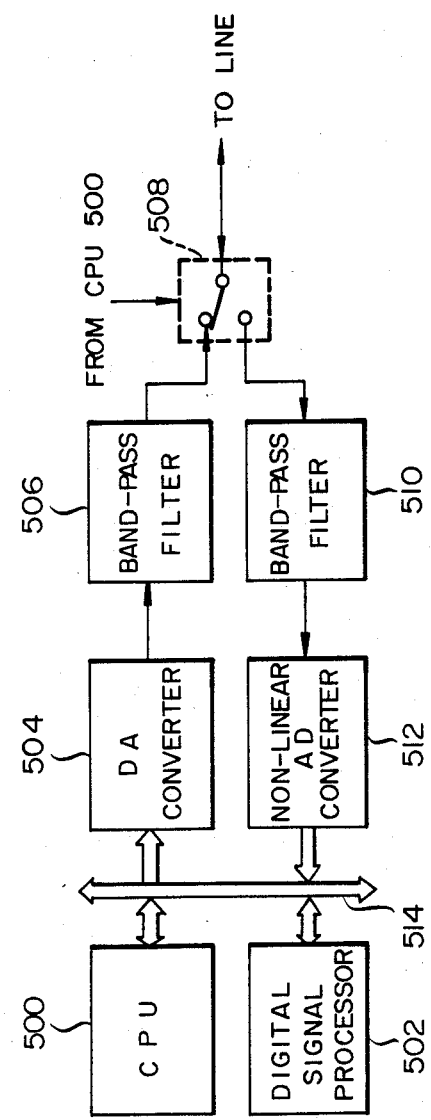
FIG. 12 is a block diagram of a third embodiment of the present invention which is elaborated to achieve the third object previously mentioned.

Referring to FIG. 12, a digital modem in accordance with the third embodiment of the present invention is shown. In FIG. 12, a central processing unit (CPU) 500 may comprise Intel 8080, for example, which features various kinds of signal processing functions as will be described. A digital signal processor 502 performs modulation/demodulation computing processings. Digital transmission data processed by the CPU 500 and digital signal processor 502 are converted by a DA converter 504 to corresponding analog transmission signals. The output of the DA converter 504 is sent out to a transmission line via a band-pass filter 506 and a switch 508, which will be connected as illustrated in a transmission mode.

An analog received signal coming in through the transmission line is routed through the switch 508 (actuated to the opposite position to the illustrated) and the band-pass filter 510 to an AD converter 512, which has a non-linear characteristic. The output of the AD converter 512, which is 8-bit digital received data corresponding in level to the analog input, is applied to the CPU 500 and the digital signal processor 502.

Figure 13:
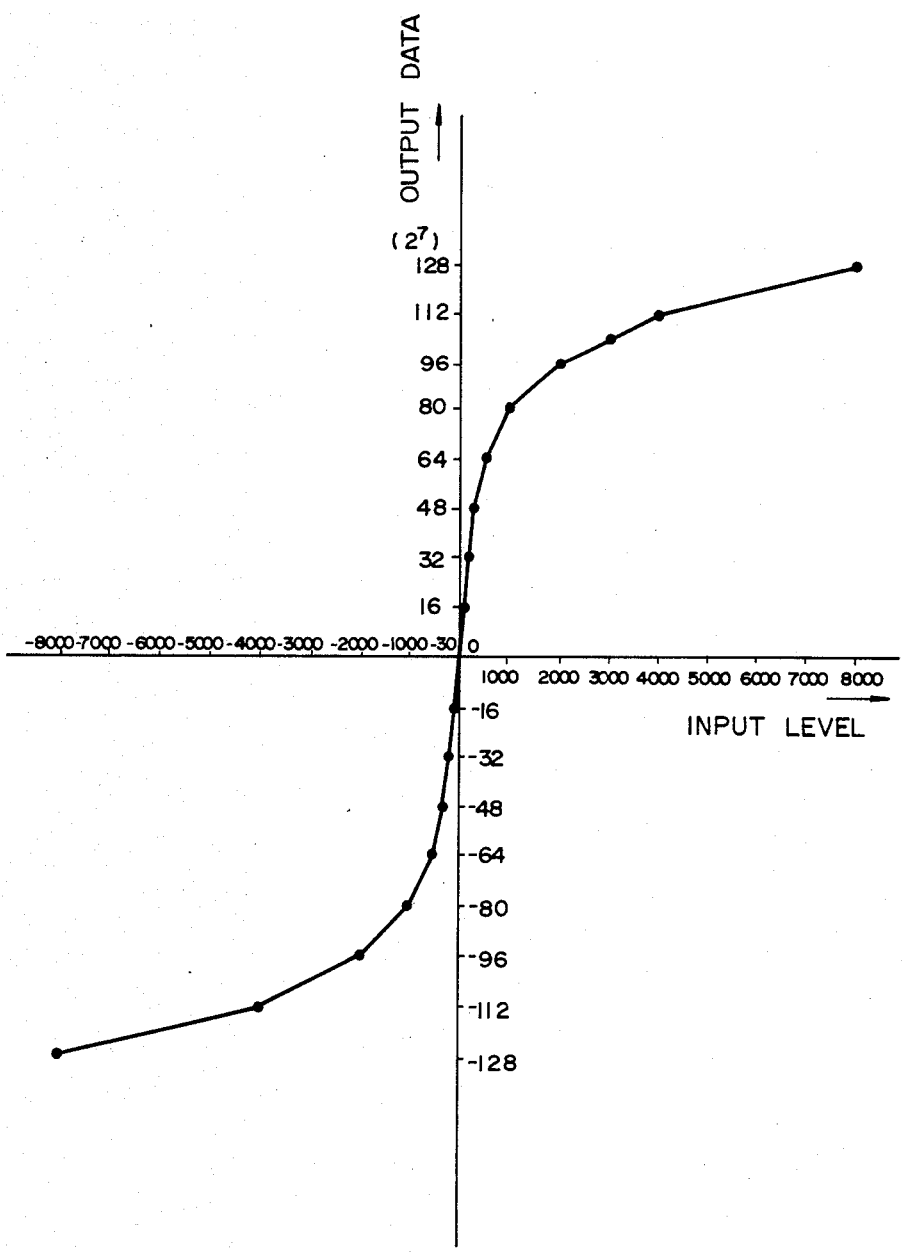
FIG. 13 is a plot showing a characteristic particular to a non-linear analog-to-digital converter in accordance with the third embodiment of the present invention.

In the illustrative embodiment, as shown in FIG. 13, the non-linearity of the AD converter 512 is such that the resolution is relatively high when the input level is low and relatively low when it is high. For example, the AD converter 512 compresses a signal corresponding to thirteen bits of input levels −30 to 8031 to about 7–8 bits of output levels −16 to 128, i.e. one byte.

Data transfer between the CPU 500, digital signal processor 502, DA converter 504 and AD converter 512 is effected over an 8-bit data bus 514.

The CPU 500 expands one byte of signal supplied from the AD converter 512 to ten and several bits of signal having linear levels, transferring the resulting two bytes to the digital signal processor 502. The CPU 500 is originally installed in order to realize various functions necessary for a modem and, in this particular embodiment, a reserve of its processing ability is used to perform the 8-bits to 10-bits conversion. Thereafter, received signal data are processed in the digital signal processor 502 as 2-byte words, i.e. 16-bit word, offering signal level resolution which is as high as ten and several bits.

Figure 14:
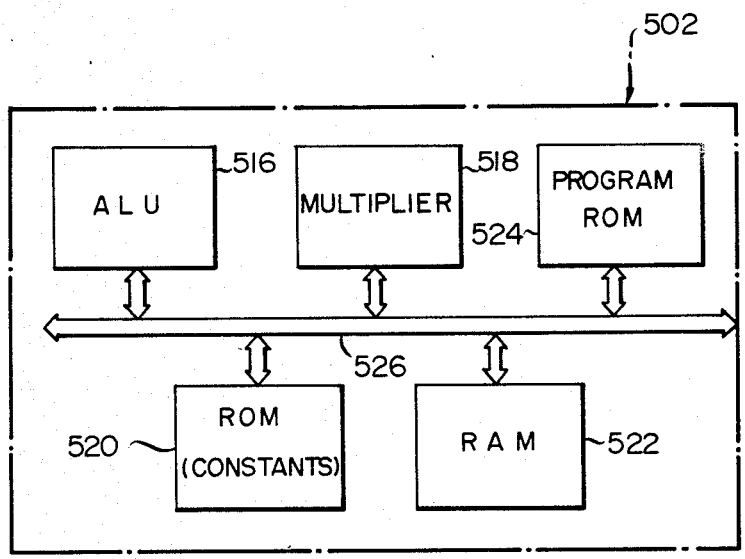
FIG. 14 is a block diagram of a digital signal processor in accordance with the third embodiment.

The internal construction of the digital signal processor 502 is shown in FIG. 14. As shown, the processor 502 comprises an arithmetic logic unit (ALU) 516, a multiplier 518, a data ROM 520 and a RAM 522 for storing various data such as constants for modulation/demodulation processings, and a program ROM 524 for storing a processings program for executing predetermined modulating and demodulating calculation with the above elements. These elements 516, 518, 520, 522 and 524 are interconnected by an internal bus 526.

Figure 15:
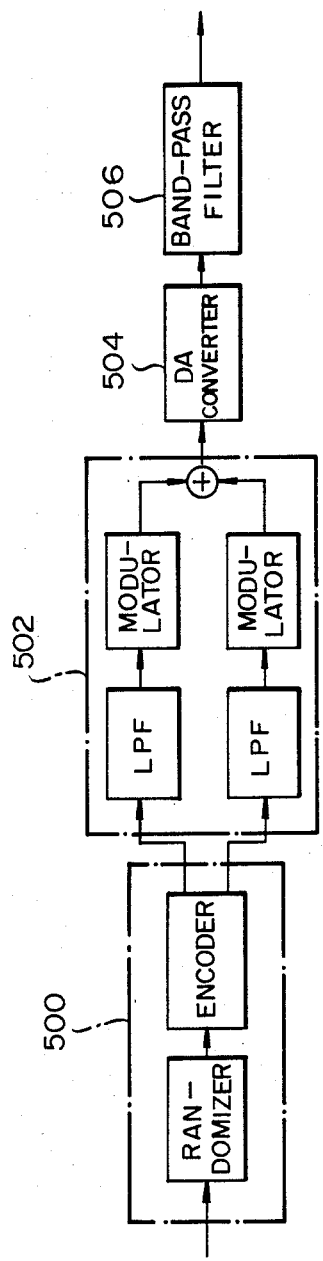
FIG. 15 is a function block diagram demonstrating the operation of the digital modem in a modulation mode in accordance with the third embodiment.
Figure 16:
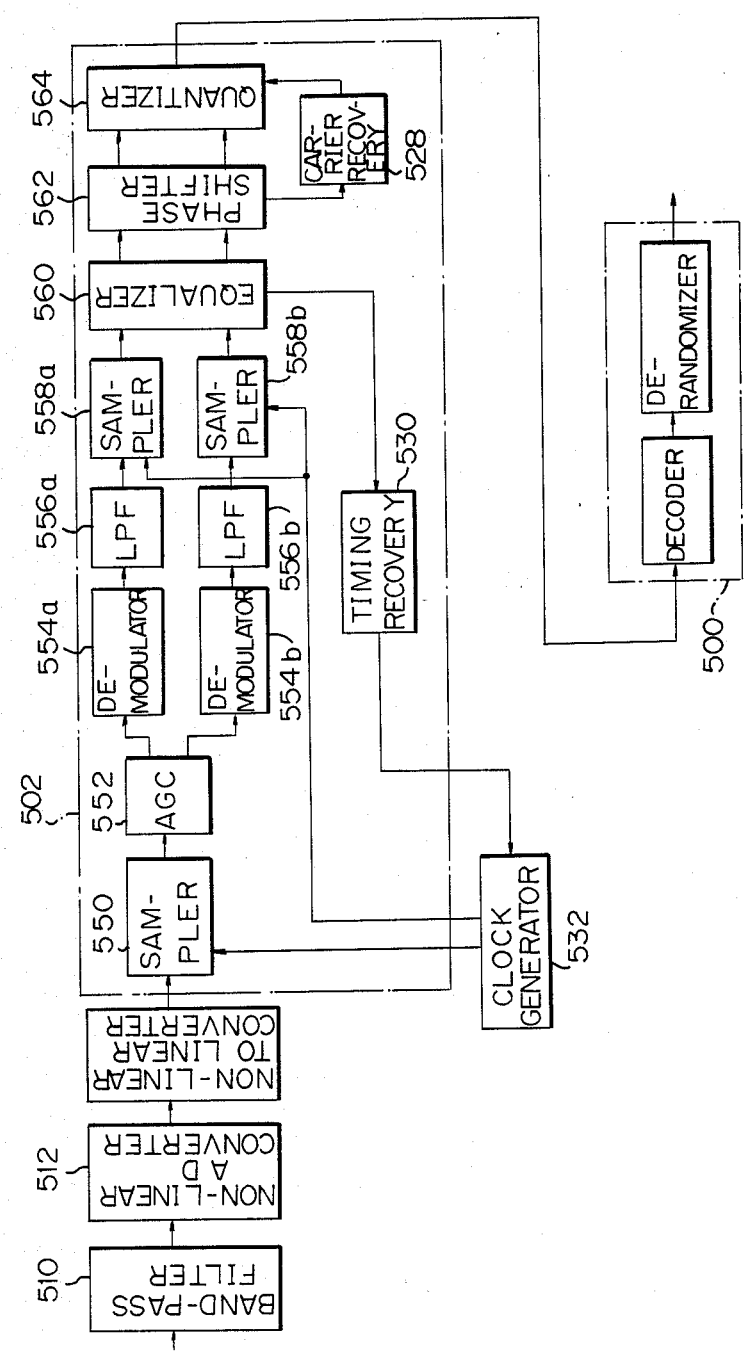
FIG. 16 is a function block diagram demonstrating the operation of the digital modem in a demodulation mode in accordance with the third embodiment.

FIG. 15 demonstrates the operation of a digital modem in a modulation mode while FIG. 16 demonstrates the operation of the same in a demodulation mode.

In a modulation mode, the CPU 500 modifies the sequence of transmission data by a predetermined method (randomizer) and, then, separates them into an in-phase component and an orthogonal component while encoding the data of the respective components by a predetermined method (encoder). The digital signal processor 502 low-pass filters (LPF) the two components (in-phase and othogonal) output from the CPU 500 independently of each other, modulates them based on a predetermined principle (modulator), adds the modulated data of the respective components, and then applies them to the DA converter 504.

Meanwhile, in a demodulation mode, the CPU 500 converts non-linear 8-bit data output from the AD converter 512 to linear data the number of bits of which matches with the digital signal processor 502 (e.g. 10 bits). The linear data are applied to the digital signal processor 502. The processor 502 samples the received data at a predetermined sampling rate (sampler 550), level-matches the sampled data while separating them into a in-phase component and an orthogonal component (AGC552), demodulates data of the respective components (demodulator sections 554a and 554b), extracts only a low-frequency component (LPF sections 556a and 556b), and samples the two components at a given timing which conforms to the transmission rate (sampler sections 558a and 558b). Thereafter, the digital signal processor 502 level-equalizes 560 the two components (equalizer), adjusts their phases (phase shifter 562), and then quantizes and combines them (quantizer 564).

A carrier recovery section 528 is adapted to recover a carrier from the processed data status at the phase shifter and supplies it to the quantizer. A timing recovery section 350 is adaped to recover timing data for compensating a sampling timing at each of the samplers from the processed data status at the equalizer. The output of the timing recovery 530 is applied to a clock generator 532 which serves to control the sampling timing at each sampler.

The data output from the digital signal processor 502 is routed to the CPU 500 to be decoded thereby into the original data (decoder) and, then, have their sequence rearranged (derandomizer) to recover the transmission data.

In the above-described embodiment, the CPU 500 transforms an output of the AD converter 512 into 10-bit data despite that the digital signal processor 502 has sixteen bits of data width. This is a position processing directed to eliminating overflow in the processings (particularly multiplication) in the processor 502 in the modulation mode. When transferred from the CPU 500 to the processor 502, the data has been converted into 16-bit data with ZEROs filled in the higher six bits.

In the manner described, in accordance with the third embodiment of the present invention, an output of the 8-bit output, non-linear AD converter 512 is transferred to the digital signal processor 502 after being expanded to 10-bit (16-bit) linear data by the CPU 500. This promotes the use of an incostly AD converter having only eight bits for the AD converter 512, realizing a cost-effective digital modem arrangement.

Furthermore, when data output from the AD converter 512 is to be transferred to the digital signal processing section which comprises the CPU 500 and the digital signal processor 502, the data width corresponds to the width of the bus line. This eliminates the need for a special bit conversion processing which would otherwise be required for the transfer.

As described above, since the third embodiment of the present invention transforms an output of a non-linear AD converter into linear data by expansion, it is possible to use an economical general purpose AD converter having a relatively small number of bits, offering an economical digital modem.

Various modifications will become possible for those skilled in the art after receiving the teachings of the present disclosure without departing from the scope thereof.

What is claimed is:

1. A digital demodulator for demodulating an analog transmission signal on a line and converting the analog transmission signal to a linear digital signal, comprising:
an analog-to-digital converter having a non-linear conversion characteristic which produces an output digital signal having a first predetermined number of bits non-linearly relative to the input analog transmission signal; and
compensation means having a non-linear conversion characteristic which converts the non-linear digital signal output from the analog-to-digital converter into said linear digital signal having a second predetermined number of bits which is larger than the first predetermined number of bits.

2. A digital demodulator for demodulating an analog transmission signal on a line and converting the analog transmission signal to a linear digital signal, comprising:
an analog-to-digital converter having a non-linear conversion characteristic which produces an output digital signal having a first predetermined number of bits non-linearly relative to the input analog transmission signal;
compensation means having a non-linear conversion characteristic which converts the non-linear digital signal output from the analog-to-digital converter into said linear digital signal having a second predetermined number of bits which is larger than the first predetermined number of bits; and
a digital signal processor which includes:
first sampling means for sampling the digital signal output from the compensation means at a predetermined sampling rate;
automatic gain control means for level-matching the sampled data output from the first sampling means and separating the sampled data into an in-phase component and an orthogonal component;
demodulating means for demodulating the in-phase and orthogonal components output from the automatic gain control means;
second sampling means for sampling the in-phase and orthogonal components output from the demodulating means at a predetermined timing which conforms to the transmission rate;
level equalizing means for level equalizing the in-phase and orthogonal components output from the level equalizing means;
phase shifting means for adjusting the phase of the in-phase and orthogonal components output from the level equalizing means; and
quantizing means for quantizing and combining the in-phase and orthogonal components output from the phase shifting means to produce said linear digital signal.

3. A digital demodulator as claimed in claim 2, further comprising low pass filter means connected between the demodulating means and the second sampling means.

4. A digital demodulator for demodulating an analog transmission signal on a line and converting the analog transmission signal to a linear digital signal, comprising:
an analog-to-digital converter having a non-linear conversion characteristic which produces an 8-bit output digital signal non-linearly relative to the input analog transmission signal;
compensation means having a non-linear conversion characteristic which converts the 8-bit non-linear digital signal output from the analog-to-digital converter into said linear digital signal having a predetermined number of bits which is larger 8 bits, the compensation means comprising a 16-bit central processing unit; and
a digital signal processor for processing the linear digital signal output from the compensation means.

5. A digital demodulator as claimed in claim 4, in which said predetermined number of bits is 16 bits.

* * * * *